US010809951B2

(12) United States Patent
Okuno

(10) Patent No.: US 10,809,951 B2
(45) Date of Patent: Oct. 20, 2020

(54) IMAGE PROCESSING DEVICE HAVING AN ADD-ON PROGRAM AND COMMUNICATABLE WITH A MOBILE TERMINAL, METHOD OF CONTROLLING IMAGE PROCESSING DEVICE, NON-TRANSITORY COMPUTER READABLE RECORDING MEDIUM THEREFOR, AND IMAGE PROCESSING SYSTEM

(71) Applicant: BROTHER KOGYO KABUSHIKI KAISHA, Nagoya, Aichi (JP)

(72) Inventor: Tetsuya Okuno, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 16/171,472

(22) Filed: Oct. 26, 2018

(65) Prior Publication Data

US 2019/0129666 A1    May 2, 2019

(30) Foreign Application Priority Data

Oct. 30, 2017  (JP) ................. 2017-209679

(51) Int. Cl.
*G06F 3/12* (2006.01)

(52) U.S. Cl.
CPC .......... *G06F 3/1253* (2013.01); *G06F 3/1205* (2013.01); *G06F 3/1236* (2013.01); *G06F 3/1292* (2013.01)

(58) Field of Classification Search
CPC ...... G06F 3/041; G06F 3/1253; G06F 3/1205; G06F 3/1236; G06F 3/1292; H04N 1/0044; H04N 1/00411; H04N 1/00307; H04N 1/00129; H04N 1/387; H04N 2201/0094; H04N 2201/0096; H04N 2201/006
USPC ......................................... 358/1.1–1.18, 402
See application file for complete search history.

(56) References Cited

U.S. PATENT DOCUMENTS

| | | | |
|---|---|---|---|
| 2011/0055820 A1* | 3/2011 | Ishikawa | G06F 8/65 717/170 |
| 2013/0257771 A1 | 10/2013 | Tomono | |
| 2015/0049359 A1* | 2/2015 | Lee | G06F 3/1292 358/1.15 |
| 2015/0181050 A1 | 6/2015 | Nishii | |
| 2016/0323217 A1* | 11/2016 | Subramani | G06F 40/274 |
| 2018/0101334 A1* | 4/2018 | Suzuki | H04N 1/00244 |

FOREIGN PATENT DOCUMENTS

| | | | |
|---|---|---|---|
| JP | 2004-295325 A | 10/2004 | |
| JP | 2013-214140 A | 10/2013 | |
| JP | 2015-122014 A | 7/2015 | |
| JP | 2017-112558 A | 6/2017 | |

* cited by examiner

*Primary Examiner* — Gabriel I Garcia
(74) *Attorney, Agent, or Firm* — Scully Scott Murphy and Presser

(57) ABSTRACT

An image processing apparatus is provided with a user interface, a wireless communication interface and a controller. The controller is configured to perform transmitting UI information via the wireless communication interface to a mobile device, the UI information being configured to cause the mobile device to display a first text input field, and transmitting a first address via the wireless communication interface to the mobile device, the first address being an address to obtain candidates of input text.

21 Claims, 10 Drawing Sheets

```
<?xml version="1.0" encoding="UTF-8"?>
<command>
  <ui>
    <next_url>./post</next_url>
    <title>FILE NAME INPUT</title>
    <text_area id="file_name"/>
  </ui>
</command>
```

```
<!DOCTYPE html>
<html>
  <head>
    <meta http-equiv="Content-Type" content="text/html; charset=UTF-8" />
    <title>FILE NAME INPUT</title>
  </head>
  <body>
    <h1>FILE NAME INPUT</h1>
    <form method="post" action="./post">
      <input type="text" name="file_name" />
      <input type="submit" value="SEND" />
    </form>
  </body>
</html>
```

IMAGE PROCESSING DEVICE HAVING AN ADD-ON PROGRAM AND COMMUNICATABLE WITH A MOBILE TERMINAL, METHOD OF CONTROLLING IMAGE PROCESSING DEVICE, NON-TRANSITORY COMPUTER READABLE RECORDING MEDIUM THEREFOR, AND IMAGE PROCESSING SYSTEM

CROSS-REFERENCE TO RELATED APPLICATIONS

This application claims priority under 35 U.S.C. § 119 from Japanese Patent Application No. 2017-209679 filed on Oct. 30, 2017. The entire subject matter of the application is incorporated herein by reference.

BACKGROUND

Technical Field

The present disclosures relate to an image processing device configured to execute a process using image data, a controlling method executed in such an image processing device, a non-transitory computer-readable recording medium storing instructions of controlling the image processing device, and an image processing system including the image processing device.

Related Art

As an image processing device, there has been known an MFP (multi-function peripheral) having a plurality of functions such as a printing function, a scanning function and a facsimile function as an example of an image processing device.

SUMMARY

The MFP is generally provided with a UI (user interface). The UI is typically configured to include a displaying part which displays information and a receiving part which receives a user operation to input information. An example of the UI is a touch panel capable of displaying information and enabling the user to input information by touching operation of the touch panel. By monitoring the display of the UI and by operating the UI, the user can make (i.e., input) necessary settings for respective functions, for example, settings of the number of copies, print quality, a sheet size and the like.

Generally, a relatively small-sized UI is provided to the MFP in order to suppress a manufacturing cost. However, due to improvement and diversification of respective functions, the number of items to be set through the UI is increasing. Therefore, it becomes difficult to guarantee user-expected visibility and operability with the UI provided to the MFP.

There has been suggested a technique using a mobile terminal such as a smartphone of a user as the UI of the MFP so that various settings necessary for execution of respective functions of the MFP can be made through the mobile terminal. According to such a technique, the operability and visibility of the mobile terminal can be used as the UI of the MFP.

According to aspects of the present disclosures, there is provided an image processing apparatus which is provided with a user interface, a wireless communication interface and a controller. The controller is configured to perform transmitting UI information via the wireless communication interface to a mobile device, the UI information being configured to cause the mobile device to display a first text input field, and transmitting a first address via the wireless communication interface to the mobile device, the first address being an address to obtain candidates of input text to be inputted into the first input field.

According to aspects of the present disclosures, there is provided a method of controlling an image processing apparatus having a user interface and a wireless communication interface. When a wireless communication is established between the mobile device and the wireless communication interface when the user interface receives an invocation instruction of the add-on program, the method includes transmitting UI information via the wireless communication interface to a mobile device, the UI information being configured to cause the mobile device to display a first text input field, and transmitting a first address via the wireless communication interface to the mobile device, the first address being an address to obtain candidates of input text to be inputted into the first input field.

According to aspects of the present disclosures, there is provided a non-transitory computer-readable recoding medium storing instructions to control an image processing apparatus having a user interface, a wireless communication interface and a controller. When a wireless communication is established between the mobile device and the wireless communication part when the user interface receives an invocation instruction of the add-on program the instructions causes, when executed by the controller, the image processing apparatus to execute transmitting UI information via the wireless communication interface to a mobile device, the UI information being configured to cause the mobile device to display a first text input field, and transmitting a first address via the wireless communication interface to the mobile device, the first address being an address to obtain candidates of input text to be inputted into the first input field.

According to aspects of the present disclosures, there is provided an image processing system including an image processing apparatus and a mobile device. The image processing apparatus is provided with a user interface, a wireless communication interface, a server communication interface configured to communicate with a server, and a controller. The controller is configured to execute receiving necessary information to execute an add-on program from the server with the server communication part when the user interface receives an invocation instruction of the add-on program. Further, when a wireless communication is established between the mobile device and the wireless communication interface after receiving necessary information to execute the add-on program transmitting UI information via the wireless communication interface to the mobile device, the UI information being configured to cause the mobile device to display a first text input field and transmitting a first address via the wireless communication interface to the mobile device, the first address being an address to obtain candidates of input text to be inputted into the first input field.

BRIEF DESCRIPTION OF THE ACCOMPANYING DRAWINGS

DETAILED DESCRIPTION OF THE EMBODIMENTS

Hereinafter, referring to the accompanying drawings, embodiments according to the present disclosures will be described.

<Image Processing System>

Figure 1:
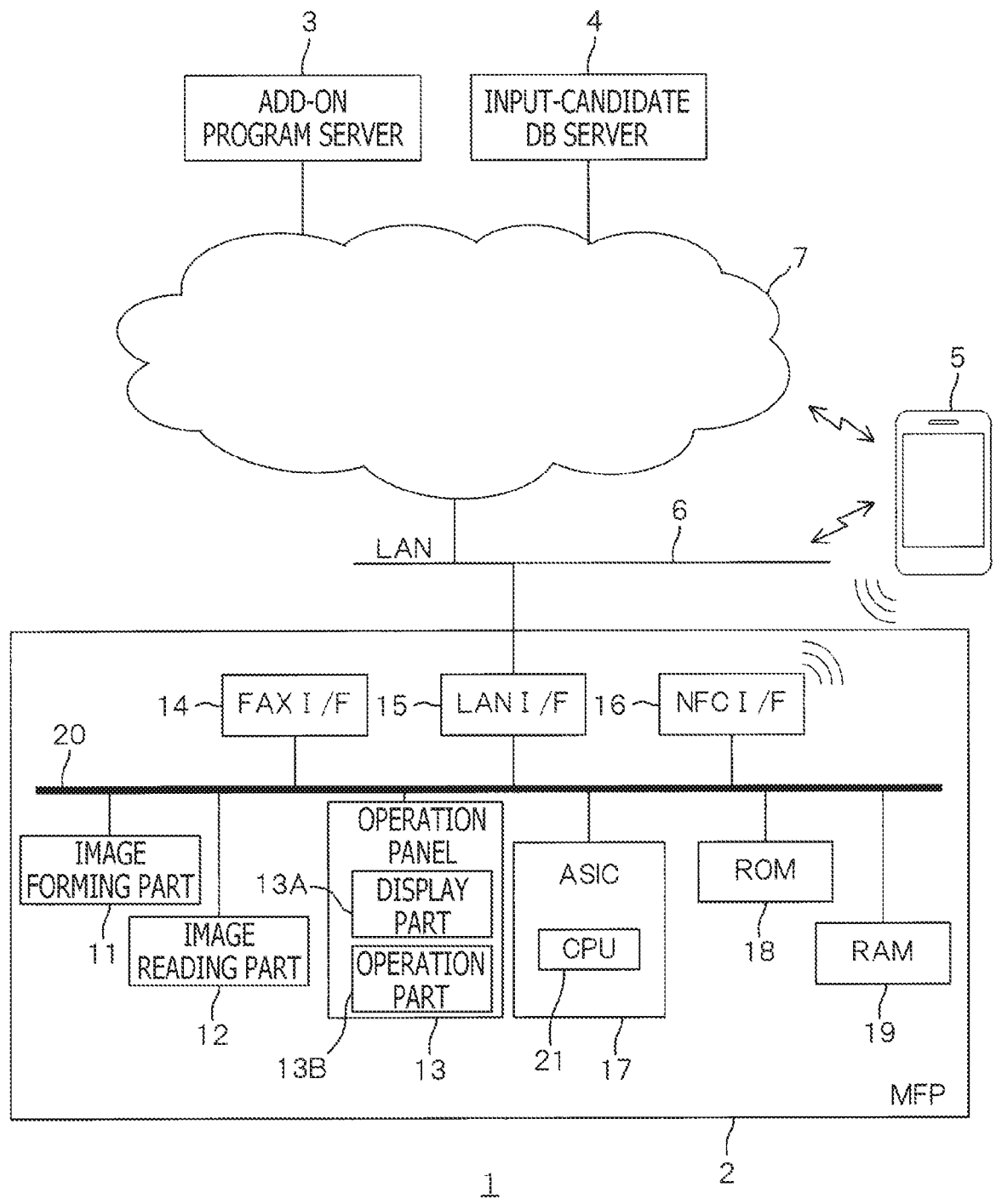
FIG. 1 is a block diagram schematically showing a configuration of an image processing system according to an illustrative embodiment of the present disclosures.

An image processing system 1 shown in FIG. 1 includes an MFP 2, an add-on program server 3, an input-candidate DB server 4 and a mobile terminal 5. The image processing system 1 is configured such that a function is realized by an add-on program with use of the MFP 2, which is an example of an image processing device.

It is noted that the add-on program is a program which adds on (i e, enhances) standard functions of an image forming device (e.g., the MFP 2). There are two types of add-on programs, which are a built-in type add-on program and a web type add-on program. The built-in add-on program is used by installing the same, for example, in the MFP 2. The web type add-on program is executed as a server (e.g., the program server 3) and the image forming device cooperate with each other. That is, when the web type add-on program is executed, the image forming device executes a process regarding the add-on program with sequentially receiving commands regarding the add-on program from the server. According to the present disclosures, the add-on program may be either of the above two types add-on programs, or a mixture of the two types of add-on programs.

The MFP 2 is installed at a place where a LAN 6 is configured, and is connected to the Internet 7 through the LAN 6. The LAN 6 may include a wired LAN, but the LAN 6 includes a WLAN (wireless LAN) using "IEEE 802.11" is one of IEEE standards. The add-on program server 3 and the input-candidate DB server 4 exist on the Internet 7. The mobile terminal 5 (which is an example of a mobile device) has a function of performing WLAN communication, and is configured to connect with the Internet 7 through the LAN 6. The mobile terminal 5 also has a function of performing a mobile data communication, and is connectable with the Internet 7 through a mobile data communication line.

<MFP>

The MFP 2 is an electronic device having multiple functions such as a facsimile function, a printing function, a scanning function and a copying function. The facsimile function is to transmit/receive image data through a public telephone line. The printing function (which is an example of an image forming function) is a function of printing an image represented by image data on a sheet such as a printing sheet. The scanning function (which is an example of an image reading function) is a function of reading an image on an original document and generate image data representing the read image.

The MFP 2 is provided with an image forming part 11, an image reading part 12, an operation panel 13, a facsimile interface (FAX I/F) 14, a LAN I/F 15, an NFC (near field communication) I/F 15, an ASIC (application specific integrated circuit) I/F 16, a ROM 18 (e.g., a rewritable nonvolatile memory such as a flash memory), and a RAM 19 (e.g., volatile memory such as a DRAM), which are interconnected though a bus 20 so as to be perform data communication with each other.

The image forming part 11 is configured to form a color image or a monochromatic (e.g., black-and-white) image on a sheet (e.g., a printing sheet) which is conveyed along a sheet conveying passage one by one. It is noted that a method of image formation may be an electrophotographic imaging method or an inkjet method.

The image reading part 12 is configured to read an image formed on the sheet and generates image data representing the read image. It is noted that a reading method may be a CIS (contact image sensor) method, or a CCD (charge coupled device).

The operation panel 13 (which is an example of a UI) includes a touch panel, which is configured such that, an operation part 13B (which is an example of a receiving part) such as a pressure sensitive type or electrostatic capacitance type transparent film switch is overlaid on a display part 13A (e.g., a liquid crystal display). On the operation panel 13, various pieces of information and operation buttons are displayed. When a user touches one of the operation buttons displayed on the operation panel 13, the operation panel 13 receives an instruction corresponding to the touched button. When receiving the instruction, the operation panel 13 transmits a signal corresponding to a content of the instruction to the ASIC 17.

The FAX I/F 14 is an interface for connection with a public telephone network used for the facsimile communication, and is provided with a MODEM having a built-in NCU (network control unit).

The LAN interface 15 (which is an example of a server communication part) is an interface for connection with the LAN 6.

The NFC I/F 16 (which is an example of a wireless communication part, a short range communication part) is an interface for the wireless communication in accordance with the NFC. The NFC is a wireless communication technique corresponding to International standards ISO/IEC14443 and ISO/IEC18092, and using a 13.56 MHz band communication frequency. The NFC I/F 16 has a touching part. A device of an IC card having the NFC communication function is closely located or contacted to the touching part in order to execute the NFC communication. Specifically, when the device having the NFC wireless communication function is located within a particular distance area with respect to the touching part, the NFC communication is established between the device and the NFC interface 16, and it becomes possible to start the data communication therebetween. It is noted that the NFC I/F 16 may be configure to also serve as the LAN interface 15 (i.e., the wireless communication part or the short range communication part may also serve as the server communication part).

In the following description, when it is described that a wireless communication device having the NFC communication function is brought to touch with the NFC I/F 16 to establish the NFC communication, it also includes a case where the wireless communication device having the NFC communication function does not actually touch but is located sufficiently close to the NFC I/F 16 so that the NFC communication can be established.

The ASIC 17 includes a CPU 21 (which is an example of a controller). The CPU 21 controls respective components such as the image forming part 11, the image reading part 12, the operation panel 13, the FAX I/F 14, the LAN I/F 15 and the NFC I/F 16 by executing programs for respective processes based in information input to the ASIC 17.

The ROM 18 stores programs to be executed by the CPU 21 and various pieces of data.

The RAM 19 is used as a work area when the CPU 21 executes respective programs.

<Add-On Program Server>

The add-on program server 3 is a server configured to supply functions to the MFP 2 with use of add-on programs. The add-on program server 3 stores add-on programs. As the add-on programs are executed, functions respectively corresponding to the add-on programs are supplied to the MFP 2. Examples of the functions which can be supplied to the MFP 2 by executing the add-on programs include a scan-upload function of uploading image data, which has been read by the image reading part 12, from the MFP 2 to the add-on program server 3 on the Internet, and a download-print function of downloading the image data from the add-on program server 3 on the Internet to the MFP 2 and print the image data downloaded from the download sever 3.

<Input Candidate DB Server>

In the input candidate DB server 4, an input candidate database is configured. The input candidate database is a collection of character strings each of which can be an input candidate. The input candidate DB server 4 has a function of transmitting candidates of character strings (i.e., input candidates) to the mobile terminal 5, based on the input candidate data base, when a function implemented by the add-on program is being executed in the MFP 2. The input candidates represent candidates of character strings to be input in a text input box 41 (see FIG. 7) displayed on the display of the mobile terminal 5.

<Mobile Terminal>

The mobile terminal 5 is a portable terminal device provided with a touch panel (e.g., a smartphone, a tablet). The mobile terminal 5 has the NFC wireless communication function in addition with the WLAN communication function and the mobile data communication function mentioned above. Therefore, when the mobile terminal 5 is located within a particular distance range with respect to the NFC interface 16 of the MFP 2, the NFC communication is established between the mobile terminal 5 and the NFC interface 16, thereby data communication therebetween being executable.

First Embodiment

<Add-On Program>

Figure 2A:
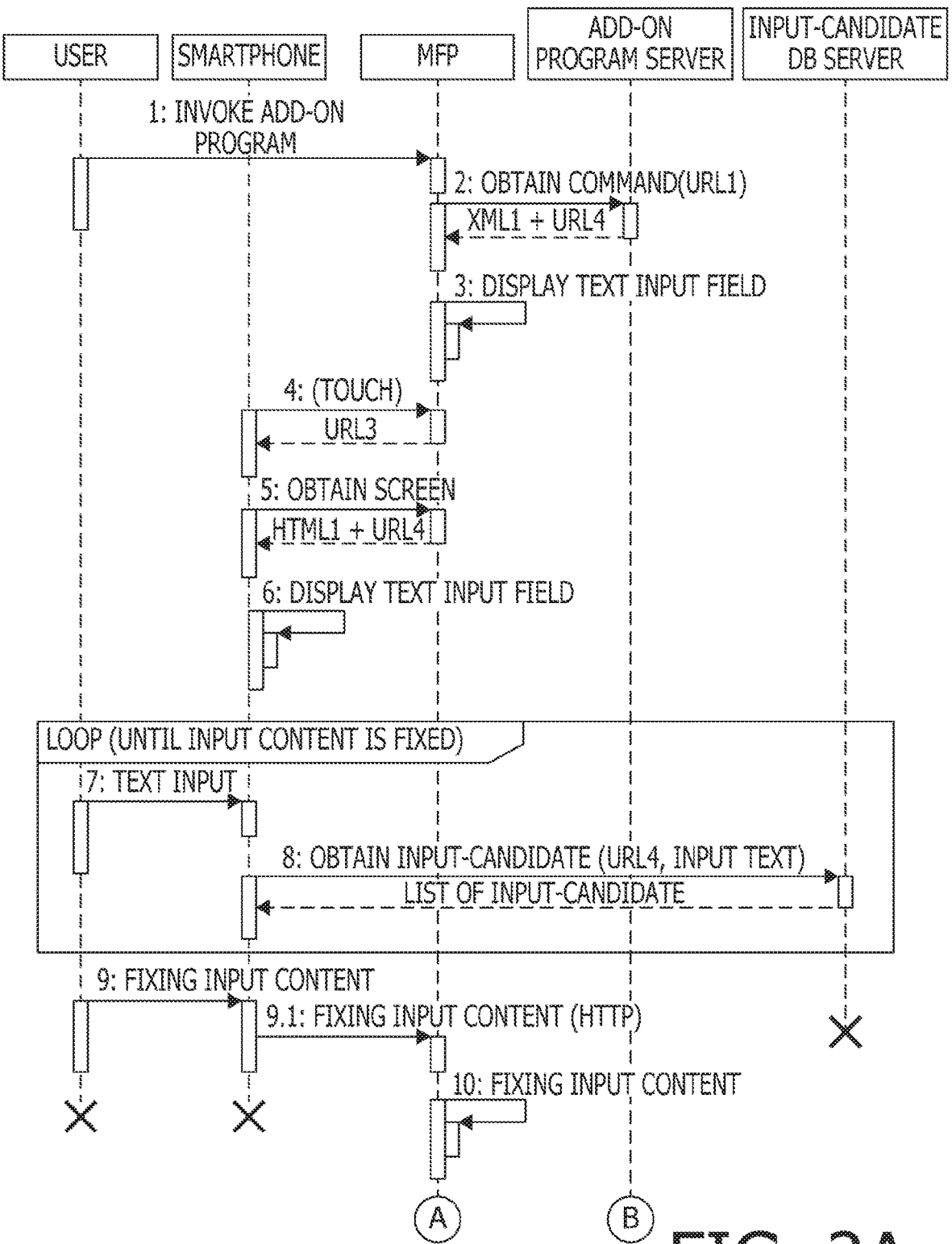
FIGS. 2A and 2B show a sequence chart illustrating a process when a function implemented by an add-on program is executed according to a first illustrative embodiment of the present disclosures.

As shown in FIG. 2A, the add-on program is invoked by the user (1: INVOKE ADD-ON PROGRAM). For example, on a menu screen displayed on the operation panel 13 of the MFP 2, a button instructing to invoke an add-on program is include. As the user depresses the bottom, the instruction to invoke the add-on program is received by the operation panel 13.

In the following description, a case where invocation of the add-on program for the scan-upload function is instructed will be described.

In response to the instruction of invoking the add-on program is received by the operation panel 13, the CPU 21 of the MFP 2 retrieves "URL1" stored in the ROM 18 to obtain a command from the add-on program sever 3, and accesses a file in the add-on program server 3 identified by the retrieved "URL1" (2: OBTAIN COMMAND).

In response to access to the file described above, a text input field display command "XML1" and an address "URL4" of an input candidate database configured in the input candidate DB server 4 are transmitted from the add-on program server 3 to the MFP 2. It is noted that "URL4" serving as an address may be transmitted from the add-on program server 3 to the MFP 2 with being included in the text input field display command "XML1". It is noted that the text input box 41 (see FIG. 7) is an example of the text input field.

Figures 3, 4:
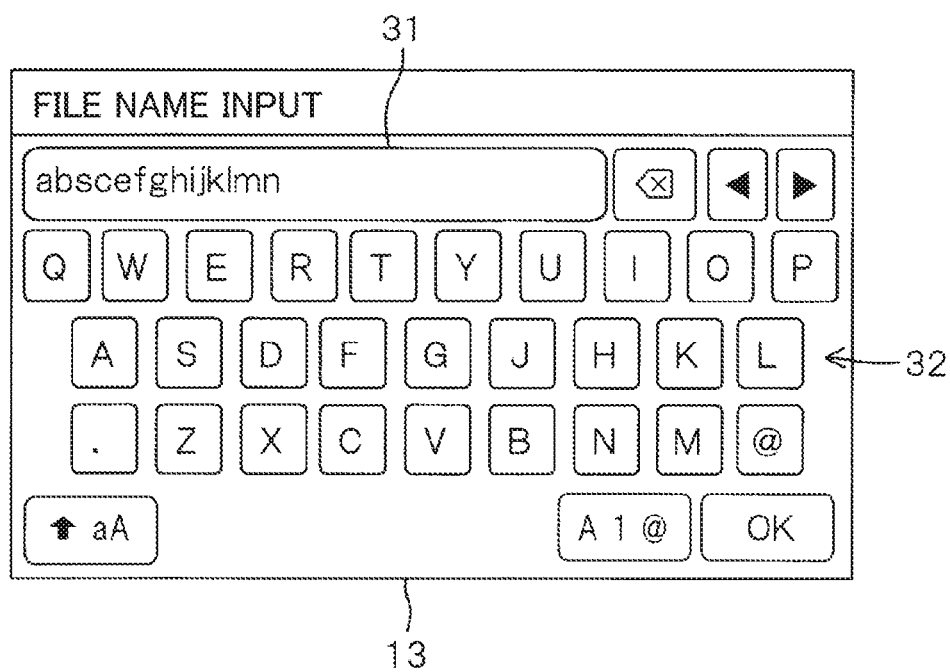
FIG. 3 shows an XML text indicating an example of a text input field display command.
FIG. 4 shows an example of the text input field displayed on an operation panel.

FIG. 3 shows an example of the text input field display command "XML1" which is a content of an XML document (file) (i.e., a document described in XML (Extensible Markup Language)). In the example shown in FIG. 3, the XML document includes an "XML declaration" described on a first line, followed by a body portion of the XML document. Since a start tag (<command>) and an end tag (</command>) are described at outermost portions of the body of the XML document and a start tag <ui> and an end tag </ui> are described therebetween, it is understood that the text input field display command "XML1" is a command regarding display of the UI. Further, between the start tag <ui> and the end tag </ui>, an element indicating that a next destination to access (i.e., "URL2") is "./post" and an element indicating that the title name to be displayed on the UI screen is a "FILE NAME INPUT", and attribution indicating that a character string input in the text input box of the UI screen is the "file name" are described. That is, by the text input field display command "XML1", it is instructed that the title name "FILE NAME INPUT" and the text input box for inputting the file name are displayed in the UI screen, while the next access destination "URL2" is designated to be "./post".

When receiving the text input field display command "XML1" from the add-on program server 3, the CPU 21 of the MFP 2 displays the text input field which is the UI screen including the title name of "FILE NAME INPUT" and the text input box for inputting the file name on the operation panel 13 (3: DISPLAY TEXT INPUT SCREEN). In this example of the text input field, as shown in FIG. 4, the title name "FILE NAME INPUT" is displayed at an uppermost part of the screen, and the text input box 31 is displayed immediately below the title name. Below the text input box 31, a QWERTY layout keyboard 32 is displayed.

When receiving the text input field display command "XML1" from the add-on program server 3, the CPU 21 of the MFP 2 creates an HTML (HyperText Markup Language) document including the content of the text input field display command "XML1" using, for example, the XSLT (XSL Transformations) which is a language for transformation of the XML document. Then, a file "HTML1" configured by the HTML document is stored in the RAM 19.

Figures 5, 6:
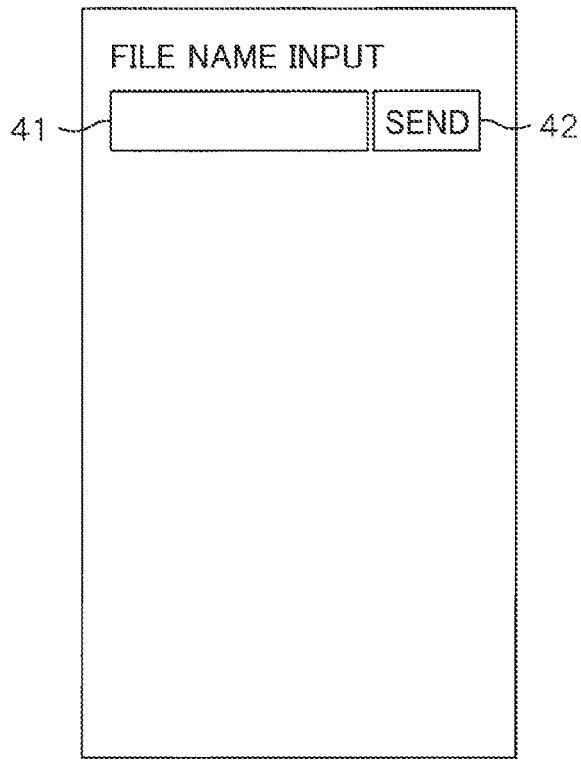
FIG. 5 shows an HTML text including an example of the text input field display command.
FIG. 6 shows an example of a text input field displayed on a mobile terminal.

Since the file "HTML1" includes the content of the text input field display command "XML1", the file "HTML1" instructs that the title name "FILE NAME INPUT" and the text input box for inputting the file name are included in the text input field, as shown in FIG. 5, and further, the next destination "URL2" to be accessed is designated in "./post". Further, the file "HTML1" instructs that the a send button is included in the text input field as "submit" is designated as a value attribution of a "SEND" element of the <Input> tag.

After displaying the text input field, when the mobile terminal 5 is brought to touch with the touching part of the NFC I/F 16 of the MFP 2 and the NFC communication is established between the mobile terminal 5 and the NFC I/F 16 (4: TOUCH), the CPU 21 of the MFP 2 creates "URL3" identifying a storing destination of the file "HTML1" in the RAM 19. Then, the CPU 21 controls the NFC I/F 16 to transmit "URL3" from the NFC I/F 16 to the mobile terminal 5 by the NFC communication.

It is noted that, until the mobile terminal 5 is brought to touch with the touching part of the NFC I/F 16 of the MFP 2, the text input field display command "XML1" is kept in the RAM 19. In response to the touching operation of the mobile terminal 5 (i.e., when the mobile terminal 5 is brought to touch with the NFC I/F 16 of the MFP 2), a file "HTML1" including the content of the text input field command "XML1" may be created, and "URL3" identifying a storing destination of the file "HTML1" in the RAM 19 may be created. Alternatively, the text input field display command "XML1" may be transformed to a file "HTML1" without using the XSLT.

In response to the mobile terminal 5 receiving "URL3", a standard browser of an operating system of the mobile terminal 5 or a browser additionally installed in the mobile terminal 5 is invoked. Then, the invoked browser accesses the address identified by "URL3" through the LAN 6 or through the mobile data communication (5: OBTAIN SCREEN).

In response to the access from the mobile terminal 5, the CPU 21 of the MFP 2 controls the LAN I/F 15 to transmit the file "HTML1" and the address "URL4" which is the address of the input candidate database configured in the input candidate DB server 4 to the mobile terminal 5. It is noted that the address "URL4" is included in the file "HTML1". Further, in the file "HTML1", codes of JavaScript® may be included.

Since the file "HTML1" is a file described in the HTML, in the mobile terminal 5, the file can be opened by the browser of the mobile terminal 5, and thus the content of the file "HTML" can be displayed on the browser of the mobile terminal 5. Accordingly, on the touch panel of the mobile terminal 5, the text input field including the title name "FILE NAME INPUT", the text input box 41 and the send button 52 is displayed on the browser (6: DISPLAY TEXT INPUT FIELD).

Figure 7:
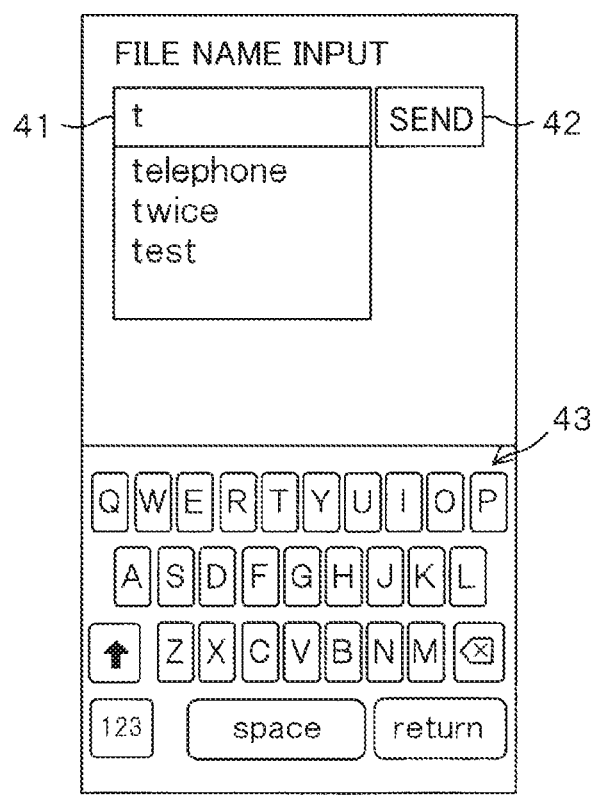
FIG. 7 shows an example of the text input field displayed on the mobile terminal when a text is being input.

When the user touches the text input box 42 displayed on the touch panel of the mobile terminal 5 with a finger or the like, as shown in FIG. 7, the keyboard 43 is displayed at a lower portion of the touch panel by the operating system. When the user touches one of the keys of the keyboard 43, a text (i.e., a letter) corresponding to the touched key is displayed in the text input box 41 (7: TEXT INPUT).

At every input of one letter in the text input box 41, the mobile terminal 5 accesses the file identified by "URL4". Since "URL4" indicates an address to access the input candidate database configured in the input candidate DB server 4, the mobile terminal 5 accesses the input candidate database at every input of one letter in the text input box 41.

In association with the access to the input candidate database, information regarding the text input in the text input box 41 is transmitted from the mobile terminal 5 to the input candidate DB server 4 (8: OBTAIN INPUT-CANDIDATE).

In response to the access from the mobile terminal 5, in the input candidate DB server 4, input candidates corresponding to the text(s) input in the text input box 41 are retrieved from the input candidate database. Then, a list of the input candidates retrieved from the input candidate database are transmitted from the input candidate DB server 4 to the mobile terminal 5. When the list of the input candidates is received, the mobile terminal 5 displays the list of the input candidates as a dropdown list below the text input box 41 in the text input field as shown in FIG. 7.

By repeatedly inputting one letter or by touching, with a finger or the like, a desired one of the character strings from the input candidates displayed in the dropdown list, the user inputs a desired character string in the text input box 41. Once the desired character string is input in the text input box 41, the user touches the send button 42 with a finger or the like. Then, the content (i.e., the character string) input in the text input box 41 is fixed (9: FIXING INPUT CONTENT) in the mobile terminal 41, and an HTTP (HyperText Transfer Protocol) message representing the fixed content is transmitted from the mobile terminal 5 to the MFP 2 through the LAN 6 (9.1: FIXING INPUT CONTENT (HTTP)). At this time, the mobile terminal 5 is connected to the MFP 2 through the LAN 6, by the WLAN communication function, such that the data communication can be done therebetween.

When receiving the HTTP message from the mobile terminal 5, the CPU 21 of the MFP 2 fixes the content input in the text input box 41 included in the text input field of the mobile terminal 5 as the content input in the text input box 31 displayed on the operation panel 13 (10: FIXING INPUT CONTENT).

Figure 2B:
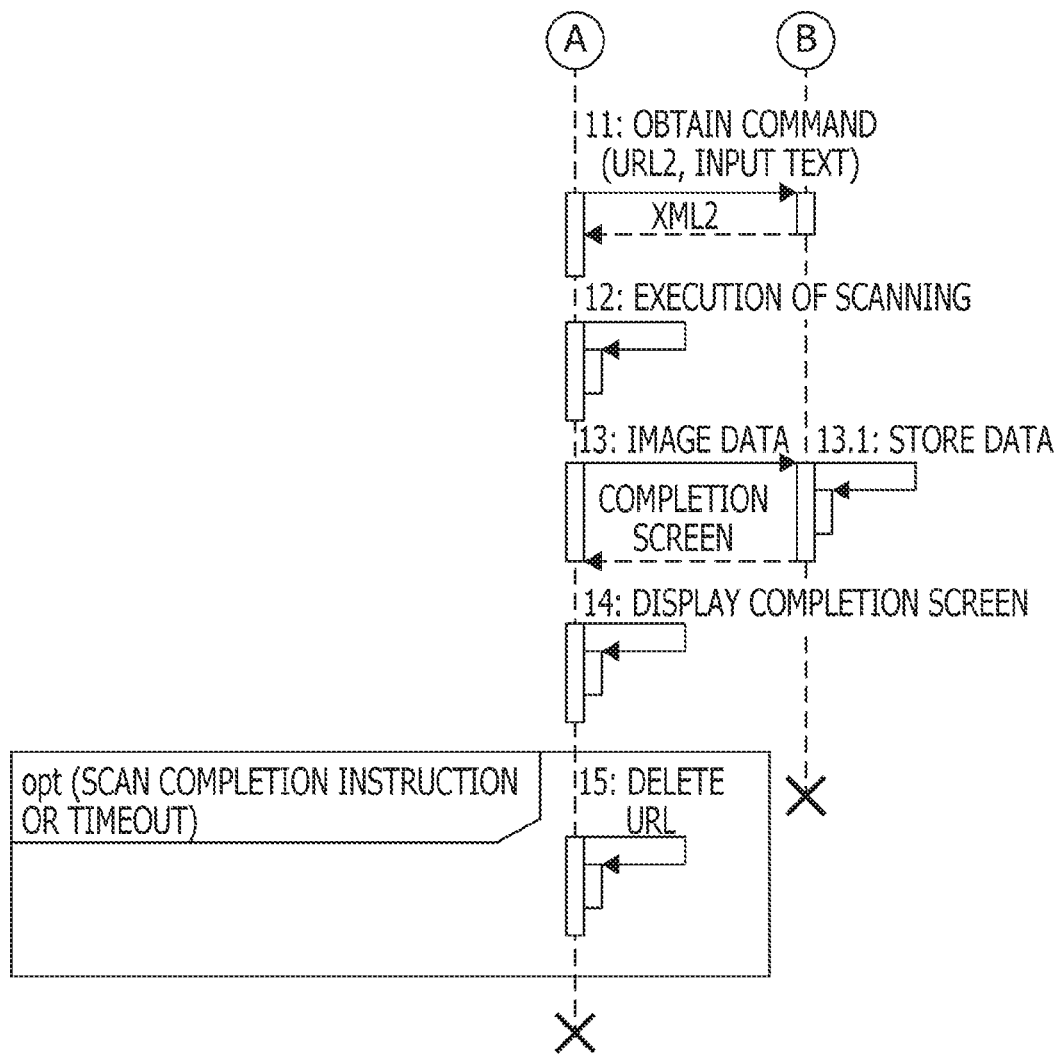

Then, the CPU 21 of the MFP 2 accesses the file stored in the add-on program server 3 identified by "URL2" as shown in FIG. 2B. Further, the CPU 21 transmits the content (i.e., input text) in the text input box 31 to the add-on program server 3 (11: OBTAIN COMMAND).

In response to access to the add-on program server 3 by the MFP 2, a scan command "XML2" is transmitted from the add-on program server 3 to the MFP 2.

In response to receipt of the scan command "XML2" from the add-on program server 3, the CPU 21 of the MFP 2 controls the image reading part 12 to execute scanning of an image on the original with use of the scanning function (12: EXECUTION OF SCANNING).

After completion of the scanning, the CPU 21 of the MFP 2 transmits the image data generated by scanning (i.e., the scan data) to the add-on program server 3 (13: IMAGE DATA).

In response to receipt of the image data, the add-on program server 3 stores the received image data using the input text which was previously received as a file name (13.1: STORE DATA). Thereafter, the add-on program server 3 transmits a completion screen displaying command to the MFP 2.

In response to receipt of the completion screen displaying command transmitted from the add-on program server 3, the CPU 21 of the MFP 2 displays the completion screen on the operation panel 13 (14: DISPLAY COMPLETION SCREEN). The CPU 21 of the MFP 2 further displays, on the completion screen, a message asking the user whether a process according to the scan-upload function is to be terminated on the operation panel 13, and a "YES" button and a "NO" button.

When the user depresses the "YES" button, or none of the "YES" button and the "NO" button has been depressed and a particular time period has elapsed since completion of scanning and a timeout is detected, the CPU 21 of the MFP 2 deletes the file "HTML1" stored in the RAM 19 together with "URL2" (15: DELETE URL).

<Effects>

As described above, after the instruction to invoke the add-on program is received by the operation panel 13, when the NFC communication is established between the mobile terminal 5 and the NFC I/F 16, the file "HTML1" is transmitted from the NFC I/F 16 to the mobile terminal 5. As the file "HTML1" is transmitted, a text input field same as that displayed on the operation panel 13 is displayed on the touch panel of the mobile terminal 5. Accordingly, the user can perform the text input on the touch panel of the mobile terminal 5.

After invocation of the add-on program is received by the operation panel 13, when the NFC communication is established between the mobile terminal 5 and the NFC I/F 16, the address "URL4" of the input candidate database configured in the input candidate DB server 4 is transmitted from the NFC I/F 16 to the mobile terminal 5. When the mobile terminal 5 receives the address "URL4" and accesses thereto, candidates for text input when the user performs the text input operation with the mobile terminal 5 are obtained. Thus, when the mobile terminal 5 is used as the operation panel 13, the input operation through the mobile terminal 5 can be performed efficiently.

When the invocation of the add-on program has not been received by the operation panel 13, even if the NFC communication is established between the mobile terminal 5 and the NFC I/F 16, the file "HTML1" or the address "URL4" will not be transmitted to the mobile terminal 5. Accordingly, when the add-on program has not been invoked, the text input filed same as the text input field displayed on the operation panel 13 is suppressed from being displayed on the touch panel of the mobile terminal 5.

In response to the operation panel 13 receiving the instruction to invoke the add-on program, the text input field display command "XML1" is transmitted from the add-on program server 3 to the MFP 2. If the MFP 2 does not receive the text input field display command "XML1", the text input filed is not displayed on the operation panel 13 or the mobile terminal 5, and the process based on the scan-upload function cannot be executed. Therefore, the text input field display command "XML1" is necessary information for executing the add-on program. As the text input field display command "XML1" is transmitted from the add-on program server 3 to the MFP 2, the text input field is displayed on the operation panel 13 and the mobile terminal 5, and the process using the scan-upload function becomes executable.

In response to the operation panel 13 receiving the instruction to invoke the add-on program, the address "URL4" of the input candidate database is transmitted from the add-on program server 3 to the MFP 2. When the address "URL4" is received, the MFP 2 stores the address "URL4" in the RAM 19. If the MFP 2 does not receive the address "URL4", the address "URL4" is not transmitted from the MFP 2 to the mobile terminal 5. Then, the mobile terminal 5 cannot access the address "URL4". Therefore, the address "URL4" is necessary information for executing the add-on program. When the scan-upload by the add-on program is completed in the MFP 2, the address "URL4" is deleted from the RAM 19. Since the address "URL4" will not be necessary after the scan-upload is completed. Accordingly, a state that the address "URL4" is kept stored in the RAM 19 can be suppressed.

In the MFP 2 which has received the text input field display command "XML1" from the add-on program server 3, the file "HTML1" including the content of the text input field display command "XML1" is generated and stored in the RAM 19. Then, before the file "HTML1" is transmitted from the MFP 2 to the mobile terminal 5, when the NFC communication is established between the mobile terminal 5 and the NFC I/F 16 of the MFP 2, the address "URL3" identifying the stored location of the file "HTML1" is transmitted from the MFP 2 to the mobile terminal 5.

In the mobile terminal 5 which has received the address "URL3", a browser is invoked and the browser accesses the address identified by the address "URL3". In response to the access by the browser, the file "HTML1" is transmitted from the MFP 2 to the mobile terminal 5, and the file "HTML1" is opened by the browser of the mobile terminal 5. Accordingly, an application software dedicated only to open the file "HTML1" is not necessary. As a result, it becomes possible to avoid the trouble of having to install dedicated application software in the mobile terminal 5, and further, shortage of the memory capacity due to installation of such application software can be suppressed.

After inputting the text on the text input filed, when the send button 42 displayed on the text input field is depressed, the content of the input text is fixed and an HTTP message indicating the fixed content is transmitted from the mobile terminal 5 to the MFP 2 through the LAN 6. In a configuration where the HTTP message is transmitted from the mobile terminal 5 to the MFP 2 with use of the NFC communication, dedicated application software for transmission is necessary. In contrast, in a configuration where the content of text input is transmitted from the mobile terminal 5 to the MFP 2 through the LAN 6, such dedicated application software is not necessary. As a result, it becomes possible to avoid the trouble of having to install dedicated application software in the mobile terminal 5, and further, shortage of the memory capacity due to installation of such application software can be suppressed.

Second Embodiment

In the first embodiment, when the send button 42 is depressed after inputting the character string in the text input box 41, the HTTP message indicating the text input in the text input box 41 is transmitted from the mobile terminal 5 to the MFP 2 through the LAN 6 (9.1: FIXING INPUT CONTENTS (HTTP)).

Figure 8:
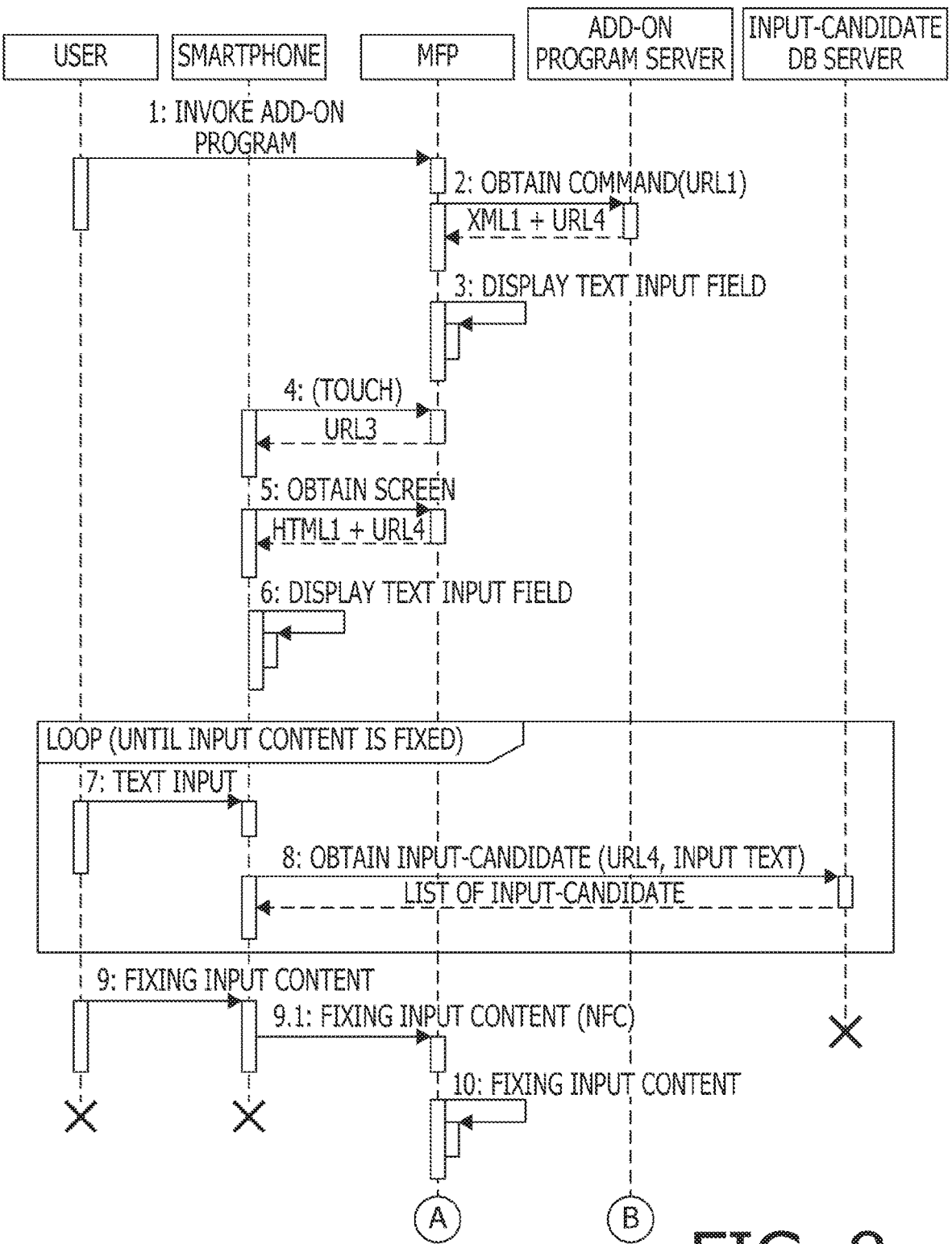
FIG. 8 shows a sequence chart illustrating a process when a function implemented by an add-on program is executed according to a second illustrative embodiment of the present disclosures.

The above-described configuration may be modified such that, as shown in FIG. 8, when the content input in the text input box is fixed as the send button 42 is depressed (9: FIXING INPUT CONTENTS), information indicating the contents input in the text input box 41 is transmitted from the mobile terminal 5 to the MFP 2 by the NFC communication (9.1: FIXING INPUT CONTENTS (NFC)). In this case, the user performs the touching operation of the mobile terminal 5 on the touching part of the NFC I/F 16 of the MFP 2 after depressing the send button 42. Then, the NFC communication is established between the mobile terminal 5 and the NFC I/F 16 of the MFP 2, and the information indicating the content input in the text input box 41 is transmitted from the mobile terminal 5 to the MFP 2 by the NFC communication.

According to the second embodiment shown in FIG. 8, it is advantageous that the MFP 2 and the mobile 5 need not be connected through the LAN 6. However, it is necessary that application software for transmitting the content input in the text input box 41 through the NFC communication should be installed in the mobile terminal 5.

Third Embodiment

Figure 9A:
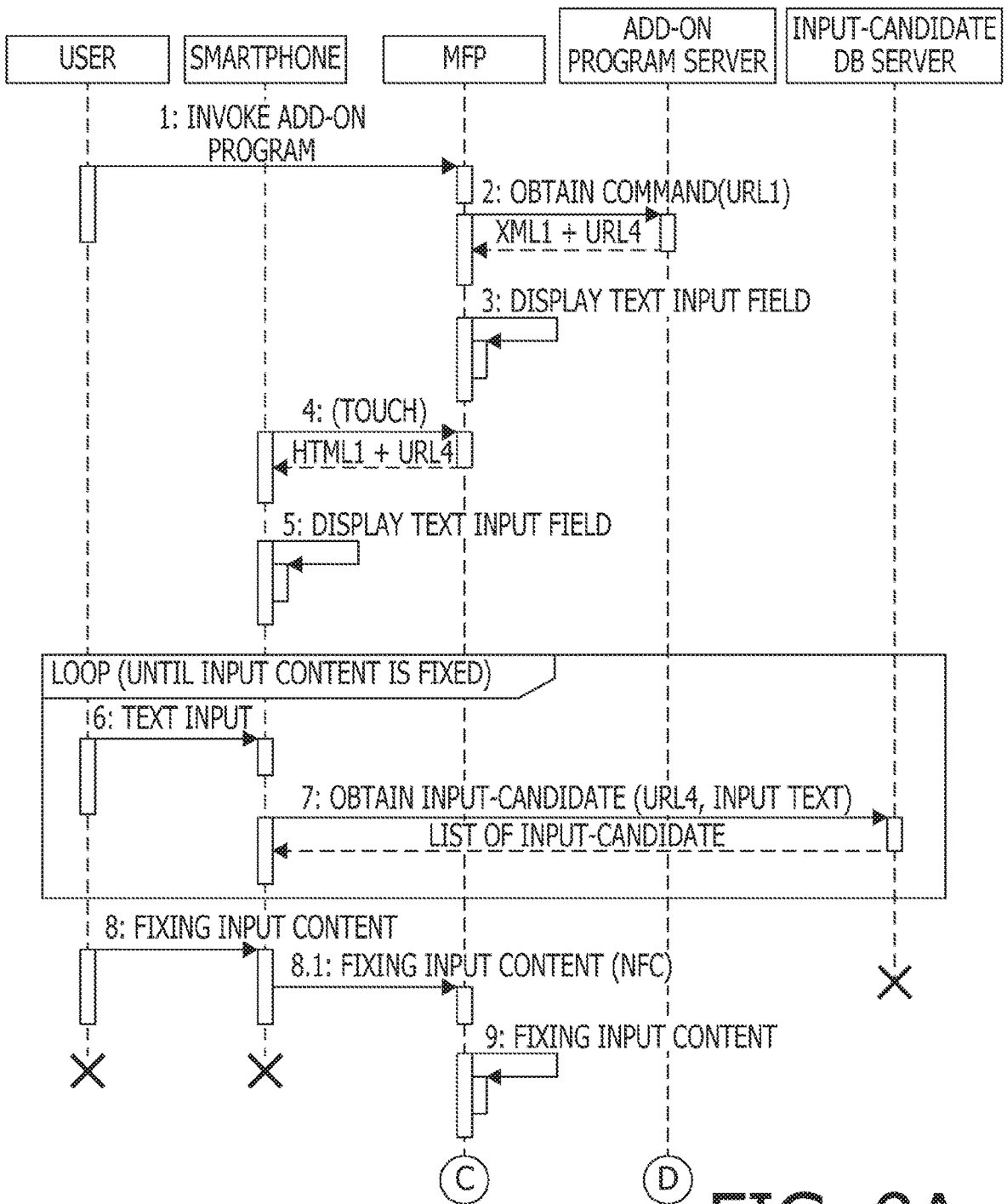
FIGS. 9A and 9B show a sequence chart illustrating a process when a function implemented by an add-on program is executed according to a third illustrative embodiment of the present disclosures.
Figure 9B:
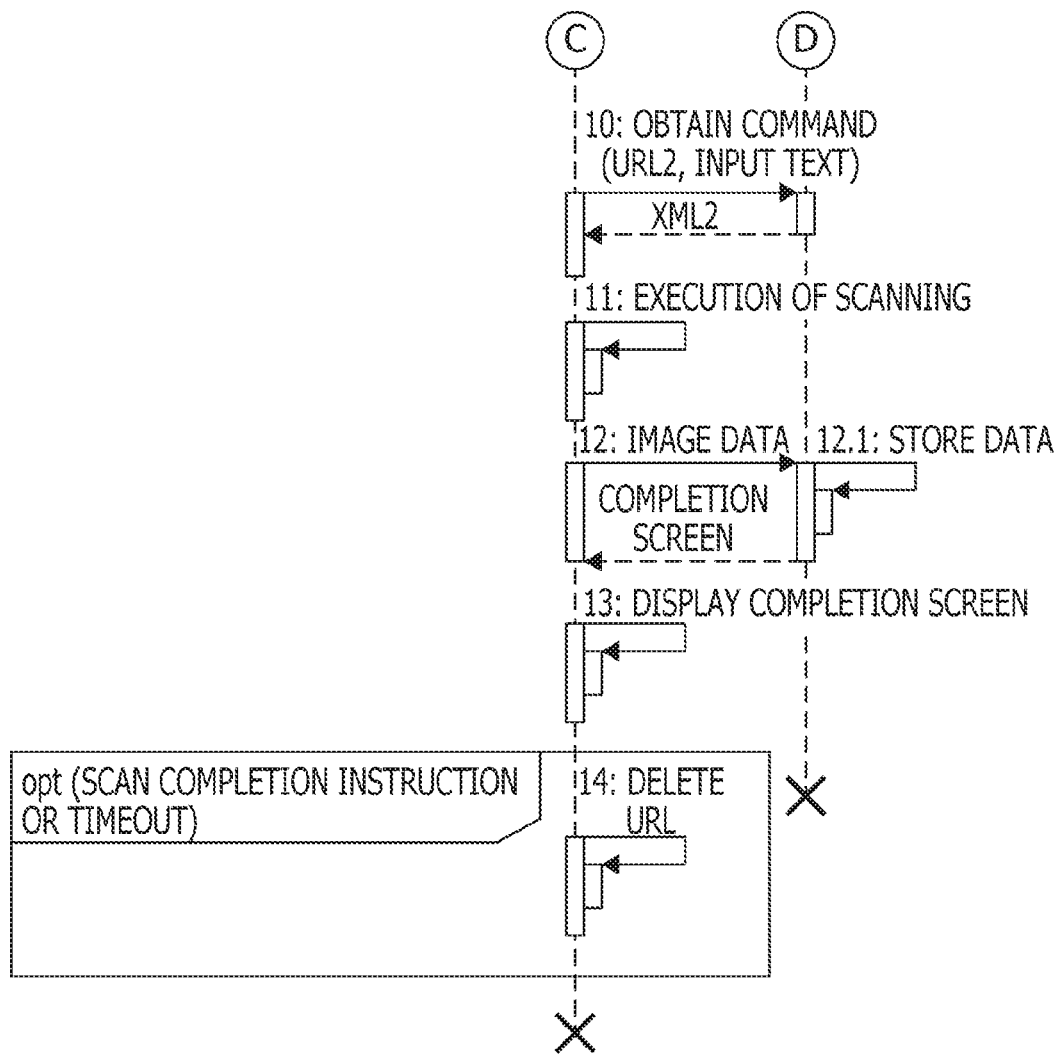
Figure 10:
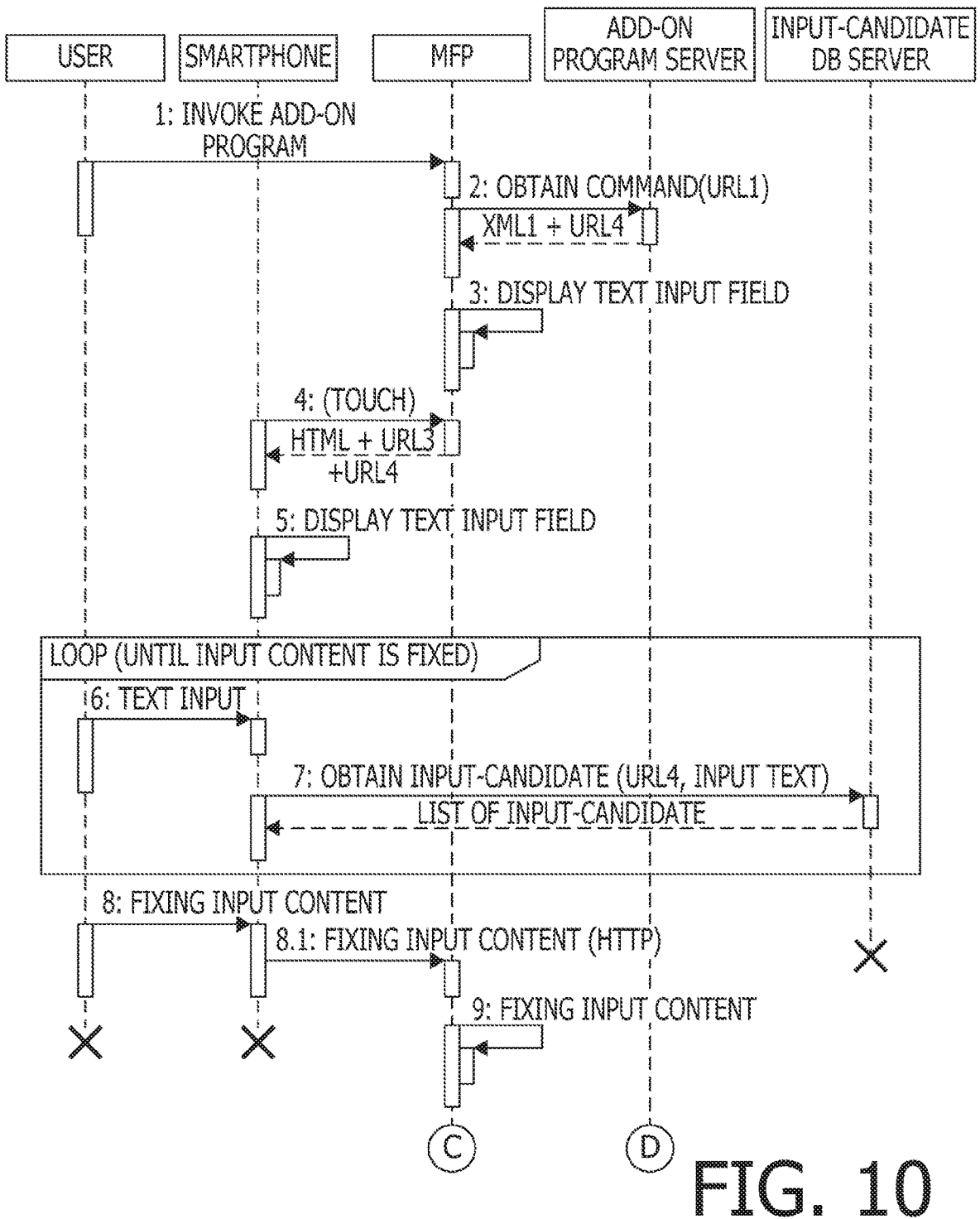
FIG. 10 shows a sequence chart illustrating a process when a function implemented by an add-on program is executed according to a fourth illustrative embodiment of the present disclosures.

The process shown in FIGS. 2A and 2B may be modified to a process shown in FIGS. 9A and 9B.

In response to receipt of the instruction to invoke the add-on program by the operation panel 13 (1: INVOKE ADDITION-TYPE PROGRAM), the CPU 21 of the ASIC 17 of the MFP 2 retrieves "URL1" stored in the ROM 18 to obtain a command from the add-on program serve 3 as shown in FIG. 9A. Then, the CPU 21 controls the LAN I/F 15 to access a file in the add-on program server 3 identified by "URL1" (2: OBTAIN COMMAND (URL1)).

In response to the above access, a text input field display command "XML1" and an address "URL4" of the input candidate database configured in the input candidate DB server 4 are transmitted from the add-on program server 3 to the MFP 2.

In response to receipt of the text input field display command "XML1" from the add-on program server 3, the CPU 21 of the MFP 2 displays the text input field, which is a UI screen including the a title of "INPUT FILE NAME" and the text input box for inputting the file name, on the operation panel 13 (3: DISPLAY TEXT INPUT FIELD).

In response to receipt of the text input field display command "XML1" from the add-on program server 3, the CPU 21 of the MFP 2 creates an HTML document including the contents of the text input field display command "XML1" with use of, for example, XSLT which is a transformation language of the XML document. Then, the CPU 21 stores the file "HTML1" including the HTML document in the RAM 19.

After the text input field is displayed, when the mobile terminal 5 is brought to touch with the touching part of the NFC I/F 16 of the MFP 2 and the NFC communication is established between the mobile terminal 5 and the NFC I/F 16 (4: TOUCH), the CPU 21 of the MFP 2 transmits the file "HTML1" and the address "URL4" which is the address of the input candidate database configured in the input candidate DB server 4 to the mobile terminal 5.

In the mobile terminal 5, in response to receipt of the file "HTML1", a standard browser of the operating system of the mobile terminal 5 or a browser additionally installed in the mobile terminal 5 is invoked by the function of the dedicated application installed in the mobile terminal 5. Then, on the browser, the content of a destination input screen file (image) is displayed (5: DISPLAY TEXT INPUT FIELD). That is, on the touch panel of the mobile terminal 5, similar to those displayed on the text input filed displayed on the operation panel 13 of the MFP 2, the title name of "INPUT FILE NAME" is displayed on the uppermost part and the text input box is displayed immediately below the title name. Further, below the text input box, a QWERTY arrangement keyboard is displayed.

The text input field display command "XML1" may be transmitted from the MFP 2 to the mobile terminal 5, and the content of the destination input screen file may be displayed on the touch panel of the mobile terminal 5 in response to receipt of the text input field display command by the function of the dedicated application software installed in the mobile terminal 5.

Thereafter, at every input of one letter into the text input box, the mobile terminal 5 accesses the file identified by the address "URL4". Since "URL4" indicates an address of the input candidate database configured in the input candidate DB server 4, the mobile terminal 5 accesses the input candidate database. When the mobile terminal 5 accesses the input candidate database, information regarding the text input in the text input box is transmitted from the mobile terminal 5 to the input candidate DB server 4 (7: OBTAIN INPUT-CANDIDATE).

In response to the access by the mobile terminal 5, in the input candidate DB server 4, input candidates corresponding to the text input in the text input box 41 are retrieved. Then, a list of the input candidates retrieved from the input candidate database is transmitted from the input candidate DB server 4 to the mobile terminal 5. In the mobile terminal 5 which receives the list of the input candidates, the list of the input candidates is displayed below the text input box 41 as a dropdown list.

The user input a desired letter string in the text input box by inputting the letters one by one, or by selecting with a finger or the like the desired letter string from among the input candidates displayed on the dropdown list. When the desired letter string has been input in the text input box, the user depressed the send button with a finger or the like. Then, in the mobile terminal 5, the content input in the text input box 41 is fixed (8: FIXING INPUT CONTENT).

The user performs the touching operation of the mobile terminal 5 on the touching part of the NFC I/F 16 of the MFP 2. Then, the NFC communication between the mobile terminal 5 and the NFC I/F 16 is established and the information indicating the content input in the text input box 41 is transmitted from the mobile terminal 5 to the MFP 2 (8.1: FIXING INPUT CONTENT(NFC)).

In response to receipt of the HTTP message from the mobile terminal 5, the CPU 21 of the MFP 2 fixes the content input in the text input box 41 included in the text input screen of the mobile terminal 5 as the content input in the text input box 31 displayed on the operation panel 13 (9: FIXING INPUT CONTENT).

Then, the CPU 21 of the MFP 2 accesses the file in the add-on program server 3 identified ty the address "URL2" as shown in FIG. 9B. Further, the CPU 21 transmits the content input in the text input box 31 (i.e., input text) to the add-on program server 3 (10: OBTAIN COMMAND).

In response to access to the add-on program server 3 by the MFP 2, the scan command "XML2" is transmitted from the add-on program server 3 to the MFP 2.

When receiving the scan command "XML2" from the add-on program server 3, the CPU 21 of the MFP 2 controls the image reading part 12 to perform scanning of the image of the original with use of the scanning function (11: EXECUTION OF SCANNING).

After completion of scanning, the CPU 21 of the MFP 2 transmits the image data generated by scanning (i.e., the scan data) to the add-on program server 3 (12: IMAGE DATA).

In response to receipt of the image data, the add-on program server 3 stores the received image data in association with the previously received input text which is used as a fine name of the image data (12.1: STORE DATA). Then, the add-on program server 3 transmits a completion screen display command to the MFP 2.

In response to receipt of the completion screen display command from the add-on program server 3, the CPU 21 of the MFP 2 displays the completion screen on the operation panel 13 (13: DISPLAY COMPLETION COMMAND). On the completion command a message asking whether the process making use of the scan-upload function is to be terminated together with a "YES" button and a "NO" button.

When the user depresses the "YES" button, or a timeout is detected (i.e., a particular period has elapsed after completion of the scanning and without user's operation of the "YES" button or the "NO" button), the CPU 21 of the MFP 2 deletes the file "HTML1" stored in the RAM 19 as well as the address "URL2" (14: DELETE URL).

According to the third embodiment shown in FIGS. 9A and 9B, it is advantageous that the MFP 2 and the mobile 5 need not be connected through the LAN 6. However, it is necessary that dedicated application software should be installed in the mobile terminal 5.

Fourth Embodiment

According to the third embodiment, when the mobile terminal 5 is subjected to the touching operation on the NFC I/F 16 after the content input in the text input box is fixed, the information indicating the content input in the text input box is transmitted from the mobile terminal 5 to the MFP 2 by the NFC communication (8.1: FIXING INPUT CONTENT (NFC)).

Alternatively, according to a fourth embodiment, after the send button 42 is depressed and a content input in the text input box 41 is fixed, an HTTP message indicating a content input in the text input box 41 is transmitted from the mobile terminal 5 to the MFP 2 through the LAN 6 (8.1: FIXING INPUT CONTENT (HTTP)).

<Modifications>

Aspects of the present disclosures may provide various modifications in addition to the four embodiments described above.

For example, according to the above-described illustrative embodiments, a configuration in which the addition-program server 3 and the input candidate DB server 4 are provided separately is described. However, aspects of the present disclosures need not be limited to such a configuration, but the add-on program server 3 and the input candidate DB server 4 may be a single server located on the Internet 7. In other words, a single server located on the Internet 7 may have a function of the add-on program server 3 and a function of the input candidate DB server 4.

According to the above-described embodiment, the commands transmitted from the addition-program server 3 to the MFP 2 are described in the XML. However, the commands may be of another text format such as JSON, or a non-text format such as binary data.

In the above-described embodiments and modifications, the "address" is described to indicated a location of the input candidate DB. It should be noted that the address may indicate a location of a relaying device through which the input candidates can be obtained.

Further, the above-described configurations can further be modified without departing from aspects of the present disclosures.

What is claimed is:

1. An image processing apparatus comprising:
a user interface;
a wireless communication interface; and
a controller configured to perform:
    transmitting UI information via the wireless communication interface to a mobile device, the UI information being configured to cause the mobile device to display a first text input field; and
    transmitting a first address via the wireless communication interface to the mobile device, the first address being an address of a candidate server from which the mobile device obtains candidates of input text to be inputted into the first text input field; and
    upon receipt of one of the candidates corresponding to the input text input into the first text input field from the mobile device, displaying the one of the candidates and performing an operation corresponding to the received one of the candidates corresponding to the input text.

2. The image processing apparatus according to claim 1, wherein the controller is configured to displaying a second text input field by the user interface, the first text input field corresponding to the second text input field.

3. The image processing apparatus according to claim 1, wherein the controller is configured not to transmit the UI information via the wireless communication interface to a mobile device or transmit the first address via the wireless communication interface to the mobile device when the controller receives an invocation instruction of an add-on program.

4. The image processing apparatus according to claim 1, wherein the controller is configured not to transmit the UI information via the wireless communication interface to a mobile device or transmit the first address via the wireless communication interface to the mobile device when the controller does not receive an invocation instruction of an add-on program.

5. The image processing apparatus according to claim 1, further comprising a server communication interface, wherein, when the controller receives the invocation instruction of a add-on program, the controller is further configured to perform:
    receiving information to perform the add-on program from the server with the server communication interface;
    transmitting UI information via the wireless communication interface to a mobile device; and
    transmitting the first address via the wireless communication interface to the mobile device.

6. The image processing apparatus according to claim 5, further comprising a storage,
wherein, when the controller receives the invocation instruction of the add-on program, the controller is configured to perform:
    receiving the address transmitted from the server with the server communication interface and storing the address in the storage; and
    deleting the address stored in the storage.

7. The image processing apparatus according to claim 5, wherein, when the wireless communication interface receives input fixing information fixing a content of text input on the mobile device from the mobile device, the controller fixes usage of the content of the text input when the add-on program is executed.

8. The image processing apparatus according to claim 6, wherein the wireless communication interface includes:
    a short range wireless communication interface; and
    a long range wireless communication interface, wherein a communication distance of the long range wireless communication is longer than a communication distance of the short range wireless communication,
wherein the storage stores the UI information, and
wherein the controller is configured to:
    transmit a second address of the UI information stored in the storage via the short range wireless transmitting interface to the mobile device when the short range wireless communication is established between the mobile device and the short range wireless communication interface; and transmit, when the UI information is transmitted to the mobile device, the UI information stored in the storage via the long range wireless communication interface to the mobile device when the mobile device accesses the URL of the UI information through the long range wireless communication interface.

9. The image processing apparatus according to claim 6, wherein the wireless communication includes a short range wireless communication interface configured to establish a short range wireless communication with the mobile device when a distance with the mobile device is within a particular distance, wherein the storage stores the UI information, and wherein the controller is configured to transmit the UI information stored in the storage via the short range wireless communication interface to the mobile device when a short range wireless communication is established between the mobile device and the short range wireless communication interface.

10. The image processing apparatus according to claim 9, when the user interface receives the invocation instruction of the add-on program, the controller transmits, when the first address is transmitted to the mobile device, the address stored in the storage via the short range wireless communication interface to the mobile device when a short range wireless communication is established between the mobile device and the short range wireless communication interface, and wherein the controller is configured not to transmit the first address to the mobile device even if a short range wireless communication is established between the mobile device and the short range wireless communication interface when the user interface does not receive the invocation instruction of the add-on program.

11. The image processing apparatus according to claim 9, wherein, when a short range wireless communication is established between the mobile device and the short range wireless communication interface and when the short range wireless communication interface receives input fixing information fixing a content of text input on the mobile device from the mobile device, the controller fixes usage of the content of the input text when executing the add-on program.

12. The image processing apparatus according to claim 11, wherein the controller is configured to execute, after fixing usage of the content of the text input when the add-on program is executed, the add-on program based on the information received when the information to perform the add-on program is received from the server with the server communication interface.

13. The image processing apparatus according to claim 8, wherein the controller is configured to:

transmit, when the first address is transmitted to the mobile device, the address stored in the storage via the long range wireless communication interface to the mobile device when the mobile device accesses the URL of the UI information through the long range wireless communication interface when the user interface receives the invoke instruction of the add-on program; and not transmit the first address to the mobile device even if the mobile device accesses the URL of the UI information through the long range wireless communication interface when the user interface does not receive the invocation instruction of the add-on program.

14. The image processing apparatus according to claim 8, wherein the controller is configured to generate the UI information based on necessary information to execute the add-on program and store the UI information in the storage.

15. A method of controlling an image processing apparatus having a user interface and a wireless communication interface, when a wireless communication is established between the mobile device and the wireless communication interface when the user interface receives an invocation instruction of the add-on program, the method including:

transmitting UI information via the wireless communication interface to the mobile device, the UI information being configured to cause the mobile device to display a first text input field; and transmitting a first address via the wireless communication interface to the mobile device, the first address being an address of a candidate server from which the mobile device obtains candidates of input text to be inputted into the first text input field.

16. A non-transitory computer-readable recoding medium storing instructions to control an image processing apparatus having a user interface, a wireless communication interface, and a controller, when a wireless communication is established between the mobile device and the wireless communication part when the user interface receives an invocation instruction of the add-on program the instructions causes, when executed by the controller, the image processing apparatus to execute:

transmitting UI information via the wireless communication interface to the mobile device, the UI information being configured to cause the mobile device to display a first text input field; and transmitting a first address via the wireless communication interface to the mobile device, the first address being an address of a candidate server from which the mobile device obtains candidates of input text to be inputted into the first text input field.

17. An image processing system including an image processing apparatus and a mobile device, the image processing apparatus comprising:
a user interface;
a wireless communication interface;
a server communication interface configured to communicate with a server; and
a controller configured to execute:
receiving necessary information to execute an add-on program from the server with the server communication interface when the user interface receives an invocation instruction of the add-on program; and
when a wireless communication is established between the mobile device and the wireless communication interface after receiving necessary information to execute the add-on program:
transmitting UI information via the wireless communication interface to the mobile device, the UI information being configured to cause the mobile device to display a first text input field; and
transmitting a first address via the wireless communication interface to the mobile device, the first address being an address to obtain candidates of input text to be inputted into the first text input field.

18. The image processing system according to claim 17, wherein the controller is configured not to transmit the UI information via the wireless communication interface to a mobile device or transmit the first address via the wireless communication interface to the mobile device when the controller receives an invocation instruction of an add-on program, the invocation instruction being inputted from the user interface.

19. The image processing system according to claim 17, wherein the controller is configured not to transmit the UI information via the wireless communication interface to a mobile device or transmit the first address via the wireless communication interface to the mobile device when the controller does not receive an invocation instruction of a add-on program, wherein the invocation instruction is to be inputted from the user interface.

20. The image processing system according to claim 17, wherein, when the controller receives the invocation instruction of the add-on program, the controller transmits the UI information via the wireless communication interface to a mobile device; and
transmits the first address via the wireless communication interface to the mobile device.

21. The image processing system according to claim 20, further comprising a storage,
wherein, when the controller receives the invocation instruction of the add-on program, the controller is configured to perform:
receiving the address transmitted from the server with the server communicating interface, and storing the address in the storage; and
deleting the address stored in the storage.

* * * * *